United States Patent
Pietschker

(10) Patent No.: US 9,990,794 B2
(45) Date of Patent: Jun. 5, 2018

(54) SYSTEM AND METHOD FOR PROCESSING BANK NOTES

(71) Applicant: GIESECKE & DEVRIENT GMBH, Munich (DE)

(72) Inventor: Andrej Pietschker, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 3 days.

(21) Appl. No.: 14/361,074

(22) PCT Filed: Nov. 27, 2012

(86) PCT No.: PCT/DE2012/001137
§ 371 (c)(1),
(2) Date: May 28, 2014

(87) PCT Pub. No.: WO2013/079050
PCT Pub. Date: Jun. 6, 2013

(65) Prior Publication Data
US 2014/0297536 A1  Oct. 2, 2014
US 2015/0052057 A2  Feb. 19, 2015

(30) Foreign Application Priority Data
Nov. 29, 2011  (DE) .................. 10 2011 119 897

(51) Int. Cl.
G07D 11/00  (2006.01)
G06Q 20/04  (2012.01)

(52) U.S. Cl.
CPC ....... *G07D 11/0078* (2013.01); *G06Q 20/042* (2013.01)

(58) Field of Classification Search
CPC .................. G07D 11/00; G06Q 20/04
See application file for complete search history.

(56) References Cited

U.S. PATENT DOCUMENTS 5,845,008 A * 12/1998 Katoh .............. G07D 7/12 382/135
6,318,537 B1 * 11/2001 Jones .............. G07D 1/04 194/346

(Continued)

FOREIGN PATENT DOCUMENTS

DE  10241149 A1  3/2004
DE  10242572 A1  4/2004

(Continued)

OTHER PUBLICATIONS

"The future of banknote processing—more service for cash", Jul. 2009, Banking Automation Bulletin—Giesecke & Devrient Perspective, 2 pages (Year: 2009).*

(Continued)

*Primary Examiner* — Bruce I Ebersman
*Assistant Examiner* — Joshua D. Bradley
(74) *Attorney, Agent, or Firm* — Workman Nydegger

(57) ABSTRACT

A system for processing bank notes and a corresponding method comprises at least one bank-note processing machine having a central control device on which only those software modules are implemented that are necessary for the standard operation of the bank-note processing machine for counting, checking and/or sorting bank notes. At least one application server is connected to the bank-note processing machine via an external communication network and has implemented thereon at least one further software module which is executed on the application server and provides an application which provides at least one function going beyond the standard operation of the bank-note processing machine. The application provided on the application server involves a configuration application, a serial-number application, a reporting application and/or a servicing application.

9 Claims, 2 Drawing Sheets

(56) References Cited

U.S. PATENT DOCUMENTS

| | | | | |
|---|---|---|---|---|
| 6,672,505 | B1* | 1/2004 | Steinmetz | G06Q 20/105 235/375 |
| 6,970,846 | B1* | 11/2005 | Drummond | G06F 3/023 235/379 |
| 7,040,531 | B2* | 5/2006 | Skinner | G07D 11/0036 235/375 |
| 7,134,009 | B2* | 11/2006 | Jonsson | G07D 11/0078 194/353 |
| 7,325,205 | B2* | 1/2008 | Duvel | G06F 3/04886 382/124 |
| 7,404,515 | B1* | 7/2008 | Shepley | G06F 3/023 235/379 |
| 7,412,087 | B2 | 8/2008 | Buntscheck | |
| 7,788,633 | B2* | 8/2010 | Kersten | G06F 8/65 382/135 |
| 7,866,545 | B2 | 1/2011 | Rapf et al. | |
| 7,929,749 | B1* | 4/2011 | Jones | G07D 11/0078 209/534 |
| 8,077,961 | B2* | 12/2011 | Schmalz | G07D 7/20 382/135 |
| 8,146,801 | B1* | 4/2012 | Crews | G06Q 20/1085 235/375 |
| 8,172,130 | B2* | 5/2012 | Drummond | G06F 3/023 235/379 |
| 8,381,917 | B2* | 2/2013 | Schmidt | G07D 11/0078 194/206 |
| 9,164,802 | B2* | 10/2015 | Netto | G06F 9/5011 |
| 2002/0026422 | A1* | 2/2002 | Kersten | G06F 8/65 705/45 |
| 2002/0107743 | A1* | 8/2002 | Sagawa | G06Q 10/10 705/17 |
| 2002/0133461 | A1* | 9/2002 | Ramachandran | G06Q 20/1085 705/43 |
| 2003/0100370 | A1* | 5/2003 | Gatto et al. | 463/42 |
| 2003/0140087 | A1* | 7/2003 | Lincoln | G06F 9/50 709/201 |
| 2004/0016797 | A1* | 1/2004 | Jones | G07D 7/0026 235/379 |
| 2004/0046015 | A1 | 3/2004 | Skinner | |
| 2004/0062430 | A1 | 4/2004 | Buntscheck | |
| 2004/0143826 | A1* | 7/2004 | Gissel | G06F 9/445 717/162 |
| 2004/0222283 | A1 | 11/2004 | Mastie et al. | |
| 2005/0097122 | A1* | 5/2005 | Schafflutzel | G06F 17/30592 |
| 2005/0161501 | A1* | 7/2005 | Giering | B42D 25/29 235/379 |
| 2006/0163027 | A1* | 7/2006 | Hobmeier | B65H 29/006 194/207 |
| 2006/0212372 | A1* | 9/2006 | Eberhard | G06Q 20/042 705/35 |
| 2007/0032295 | A1* | 2/2007 | Muir | G07F 17/32 463/29 |
| 2007/0152034 | A1* | 7/2007 | Dietz | G07D 7/00 235/379 |
| 2007/0296202 | A1* | 12/2007 | Zwahlen | G07D 11/00 283/58 |
| 2008/0032801 | A1* | 2/2008 | Brunet de Courssou | G07F 17/32 463/42 |
| 2008/0107325 | A1* | 5/2008 | Schmalz | G07D 7/20 382/135 |
| 2008/0126547 | A1* | 5/2008 | Waldspurger | G06F 9/4881 709/226 |
| 2008/0283589 | A1 | 11/2008 | Rapf et al. | |
| 2009/0022390 | A1* | 1/2009 | Yacoubian | G07D 11/0084 382/135 |
| 2009/0212105 | A1* | 8/2009 | Couper | G06Q 20/105 235/379 |
| 2009/0222362 | A1* | 9/2009 | Stood | G06Q 10/00 705/30 |
| 2010/0032351 | A1 | 2/2010 | Schmidt | |
| 2010/0157822 | A1* | 6/2010 | Ivanov | H04L 41/5009 370/252 |
| 2011/0061988 | A1* | 3/2011 | Lonsdale | G07D 7/12 194/303 |
| 2011/0129139 | A1* | 6/2011 | Numata | G07D 7/0006 382/137 |
| 2011/0199649 | A1* | 8/2011 | Steidl | B65H 7/06 358/406 |
| 2011/0208606 | A1* | 8/2011 | Hadar | G06Q 30/0222 705/26.2 |
| 2012/0084183 | A1* | 4/2012 | Shanker | G06Q 30/0601 705/30 |
| 2012/0197433 | A1* | 8/2012 | Buchmann | G07D 11/0084 700/224 |
| 2014/0108245 | A1* | 4/2014 | Drummond | G06F 3/023 705/43 |

FOREIGN PATENT DOCUMENTS

| | | |
|---|---|---|
| DE | 10360860 A1 | 7/2005 |
| DE | 102004033092 A1 | 1/2006 |
| EP | 1413993 A1 | 4/2004 |
| WO | 02/075671 A1 | 9/2002 |

OTHER PUBLICATIONS

International Search Report from corresponding International PCT Application No. PCT/DE2012/001137, dated Jun. 6, 2013.
International Preliminary Report on Patentability from corresponding International PCT Application No. PCT/DE2012/001137, dated Jun. 3, 2014.
German Search Report from DE Application No. DE 10 2011 119 897.4, Jul. 12, 2012.

* cited by examiner

SYSTEM AND METHOD FOR PROCESSING BANK NOTES

BACKGROUND

The present invention relates to a system and a method for processing value documents, in particular bank notes. The term "processing" of bank notes is understood here to be in particular the counting, checking and sorting of bank notes.

SUMMARY

The present invention is employable in principle without restriction for any kind of sheet-like value documents. A special focus of the present invention lies on bank notes, however, so that hereinbelow the term "bank notes" will normally be employed for simplicity's sake instead of the general term "value documents", but this is not to be understood in a restrictive manner.

For processing bank notes there are employed bank-note processing machines which usually consist of a plurality of portions or processing zones which are disposed one after the other and perform different working steps. The number, kind and arrangement of the portions can vary depending on the requirements for the processing of the bank notes. Typically, a bank-note processing machine comprises at least one input portion with an input pocket, an operator control portion as well as an output portion with a plurality of output pockets. After being input into the input pocket, the bank notes are singled in the input portion and captured by sensors in a checking device in order to recognize those bank notes that are no longer fit for taking part in bank-note circulation. These are separated from the bank notes fit for circulation and output separately or destroyed, where applicable. The bank notes fit for circulation are transported further by means of a transport system and output in the output pockets of the output portion, being sorted for example according to the value of a bank note. Optionally, such a bank-note processing machine can have a shredder module for destroying selected bank notes and/or modules for stacking or bundling processed bank notes. The sequence of bank-note processing can be controlled and monitored by an operating person via a user interface, which is usually located in the operator control portion.

For coordinated control of the hereinabove described components of a bank-note processing machine, the latter normally has a central control device, which is frequently an industrial PC built into the bank-note processing machine, or a corresponding mainboard. An industrial PC is usually based on an IBM-compatible personal computer and can be operated with software for such devices. Such industrial PCs based on an IBM-compatible personal computer have many advantages as a result of the mass production, such as a high degree of standardization with regard to both the hardware and the software, and a large offer of peripheral components and application software. An industrial PC must meet special requirements compared with devices for the office area (office PCs) and is normally designed to be especially robust e.g. with regard to environmental influences or electromagnetic disturbances, and altogether largely fail-safe.

Such an industrial PC built into a bank-note processing machine, or a corresponding mainboard, is often operated with a conventional PC operating system, e.g. WINDOWS or LINUX, which is stored in a non-volatile memory unit, e.g. a hard disk, of the industrial PC. Besides the operating system, the memory unit of the industrial PC normally has further software modules installed thereon. Depending on the applications for which a bank-note processing machine is to be used, the memory unit can have installed thereon not only the software modules that are necessary for the standard operation of a bank-note processing machine, such as for example respective software modules for controlling the checking device, the transport system and/or a user interface (for example in the form of a touchscreen) of the bank-note processing machine, but also further, possibly optional software modules that are not necessary for the standard operation of the bank-note processing machine but rather relate to additional applications relating in particular to the processing of the data arising in the standard operation of the bank-note processing machine, such as e.g. the processing of raw image data, the capture of serial numbers, and the like.

The power of the control device of a bank-note processing machine must meet constantly increasing requirements, since an important quality feature of a bank-note processing machine is the speed at which bank notes can be processed, e.g. sorted, by the machine (i.e. the throughput rate). The processing speeds of modern bank-note processing machines reach values of up to 50 bank notes per second. When e.g. digital images of bank notes with a resolution sufficient for allowing the testing of the bank notes' security features are created at such processing speeds, the image data arising during operation of the bank-note processing machine have a size of up to some gigabytes per second. When images of the front and back of the bank note and/or images in different wavelength regions are moreover created, there arise even greater amounts of data which must be processed by the central control device of the bank-note processing machine.

To enable such amounts of data to be processed by the bank-note processing machine in real time, the industrial PC built into the bank-note processing machine, or a corresponding mainboard, is conventionally so designed from the start that it can handle not only the tasks necessary for the standard operation of the bank-note processing machine, but also such "optional" tasks in particular for data processing, i.e. has a processor unit with high processor power. Such an approach to arranging the control device of a bank-note processing machine can involve the problem, however, that the control device is designed too powerfully for standard operation, since for example the requirements and needs of an operator of a bank-note processing machine can change in the course of time, in that for example the optional recording and/or processing of raw image data is no longer required and/or the amount of bank notes to be processed decreases, thereby wasting resources. There can also occur the reverse case, however, that due to increased requirements of an operator of a bank-note processing machine the built-in central control device is not powerful enough to meet the increased requirements, which normally means that the operator must purchase a completely new bank-note processing machine.

Against this background, the present invention is based on the object of providing a system and a method for processing bank notes wherein there is employed at least one bank-note processing machine that can be flexibly adapted to the needs of the operator of the bank-note processing machine.

This object is achieved according to the invention by the subject matter of claim 1. A corresponding method for processing bank notes is the subject matter of the independent method claim. Advantageous developments of the invention are defined in the subclaims.

According to a first aspect of the invention, a system for processing value documents, in particular bank notes, is provided. The system comprises at least one bank-note processing machine having a central control device on which only those software modules are implemented that are necessary for the standard operation of the bank-note processing machine, in particular for counting, checking and/or sorting bank notes. Further, the system comprises at least one application server which is connected to the bank-note processing machine via an external communication network and has implemented thereon at least one further software module which is executed on the application server and provides an application which provides at least one function going beyond the standard operation of the bank-note processing machine.

According to a second aspect of the invention, a method for processing value documents, in particular bank notes, is provided. The method comprises the steps of executing those software modules on a bank-note processing machine that are required for the standard operation of the bank-note processing machine, in particular for counting, checking and/or sorting bank notes, as well as executing at least one further software module on an application server which can communicate with the bank-note processing machine via an external communication network to thereby provide an application which provides at least one function going beyond the standard operation of the bank-note processing machine.

Essential to the invention is thus in particular that in principle optional applications which are provided by corresponding software modules and are not necessary for the standard operation of a bank-note processing machine are moved to the application server, which can thus provide its power to the bank-note processing machine flexibly according to the momentary requirements to be met by said machine.

According to a preferred embodiment, the central control device of the bank-note processing machine is an industrial PC or a corresponding mainboard on which a PC operating system, such as e.g. WINDOWS or LINUX, is installed.

Preferably, the bank-note processing machine comprises at least one checking device which captures raw data and/or measuring data of the bank notes processed with the bank-note processing machine. In this connection, the software module provided on the application server preferably provides an application which is arranged for processing the raw data and/or measuring data captured by the checking device of the bank-note processing machine.

According to a preferred embodiment, the raw data and/or measuring data captured by the checking device of the bank-note processing machine contain the raw data and/or measuring data from at least one bank note determined as a forgery. In this connection, the application server has stored therein, preferably for each type of bank-note processing machine, configuration data which can be employed by the bank-note processing machine in connection with a bank note's raw data and/or measuring data for rating or classifying a bank note. Preferably, a configuration application is executed on the application server for this purpose, so that the application server is arranged for adapting the configuration data stored therein, preferably for each type of bank-note processing machine, on the basis of the raw data and/or measuring data, in particular the raw data and/or measuring data of a bank note determined as a forgery, in order to make the adapted configuration data available to bank-note processing machines of the corresponding type. Alternatively or additionally, the configuration application is arranged for producing on the basis of the raw data and/or measuring data, in particular the raw data and/or measuring data of a bank note determined as a forgery, a template of such a forged bank note. Such a template can be employed when processing further bank notes for identifying and sorting out false bank notes.

According to a preferred embodiment, the raw data and/or measuring data provided by the checking device of the bank-note processing machine contain serial-number data of the bank notes processed by the bank-note processing machine. Preferably, the application server is arranged, due to a serial-number application executed thereon, for storing in a serial-number archive the serial-number data provided by a bank-note processing machine. In this preferred embodiment, the application server is preferably further arranged, due to the serial-number application executed thereon, for supervising the bank-note circulation between bank-note processing machines that are in communication with the application server, using the serial-number data provided by a bank-note processing machine and using the serial-number archive. Alternatively or additionally, the serial-number application is preferably arranged for storing in the serial-number archive in connection with the serial number of a bank note further data relating to the bank note, such as for example the bank-note value, the bank-note processing machine with which this bank note was processed, date and time of processing, the intensity of a security feature of the bank note as measured by the checking device of the bank-note processing machine, the limpness of the bank note, the presence of an adhesive strip on the bank note, and the like. This preferred embodiment allows information to be collected by means of the serial-number archive for example about how fast a bank note and/or individual security features of a bank note wear out.

Alternatively or additionally, the raw data and/or measuring data provided by a bank-note processing machine can further comprise digital images of the bank notes processed by the bank-note processing machine, which are processed and/or analyzed by means of an application provided by the application server, in order for example to extract the serial number of a bank note. This function can also be integrated into the serial-number application.

According to a further preferred embodiment, a reporting application can further be executed on the application server, so that said server is arranged for accordingly editing the raw data and/or measuring data provided by a bank-note processing machine, as well as further data relating to the bank-note processing machine, such as operating data of the bank-note processing machine or accounting data, and creating therefrom a summary, that is for example prescribed by standards or guidelines, of these edited raw data and/or measuring data as well as of the further data relating to the bank-note processing machine, in the form of an electronic document, for example in the form of a Word document, PDF document and/or Excel file.

Preferably, the application server additionally or alternatively provides a servicing application, so that said server is arranged for determining and supervising a bank-note processing machine's need for servicing on the basis of the raw data and/or measuring data provided by the bank-note processing machine. The servicing application executed on the application server can for example determine a bank-note processing machine's need for servicing by comparing the measuring data of a bank-note processing machine with the raw data and/or measuring data of bank-note processing machines of the same type. If this comparison yields a drop in performance of a bank-note processing machine, the servicing application executed on the application server can prompt a servicing of this bank-note processing machine. Alternatively or additionally, the servicing application executed on the application server can, on the basis of the raw data and/or measuring data provided by a bank-note processing machine, prompt the servicing of this bank-note processing machine when for example the raw data and/or measuring data indicate that a bank-note processing machine has processed a number of bank notes that is greater than a definable threshold value.

According to a preferred embodiment, the external communication network can be the Internet, a non-public communication network, e.g. a company's communication network, or a combination thereof.

Preferably, a respective bank-note processing machine and/or the application server has stored thereon electronic keys by means of which the transfer of data between a bank-note processing machine and the application server can be encrypted and/or a mutual authentication process can preferably be carried out between a bank-note processing machine and the application server before the bank-note processing machine can access applications that are implemented on the application server, and/or the bank-note processing machine can relay raw data and/or measuring data to the application server for further processing. Preferably, the authentication process is a challenge-response authentication.

The person skilled in the art will appreciate that the hereinabove described preferred embodiments can be advantageously implemented within the framework of the first aspect of the invention, i.e. within the framework of the system for processing bank notes, as well as within the framework of the second aspect of the invention, i.e. within the framework of the method for processing bank notes.

The invention offers the following advantages, among others. The operator of a bank-note processing machine can access new optional services or applications independently of the hardware configuration of his bank-note processing machine. It is also possible here for hardware-intensive services or applications to extend the standard operation of bank-note processing machines which are basically not arranged for such services or applications.

BRIEF DESCRIPTION OF THE DRAWINGS

Further features, advantages and objects of the invention can be found in the following detailed description of several exemplary embodiments and alternative embodiments. Reference is made to the drawings, in which there are shown.

DETAILED DESCRIPTION OF VARIOUS EMBODIMENTS

Figure 1:
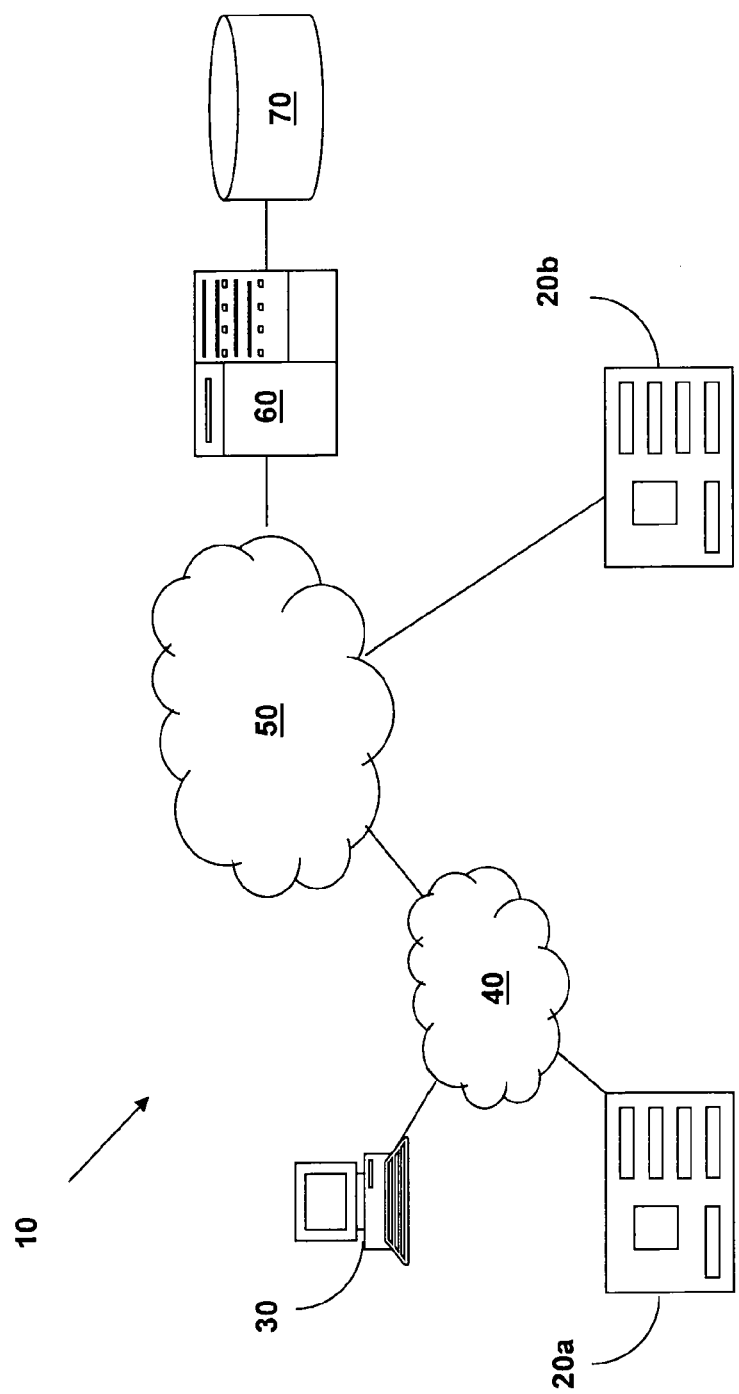
FIG. 1 a schematic representation of a preferred embodiment of a system for processing bank notes, and FIG. 2 a schematic detail view of a bank-note processing machine of the system for processing bank notes of FIG. 1.

FIG. 1 shows a schematic representation of a system 10 for processing bank notes according to a preferred embodiment of the invention. The system 10 comprises a first bank-note processing machine 20a as well as a second bank-note processing machine 20b which are in particular arranged for counting, checking and/or sorting bank notes. The bank-note processing machine 20a is part of a local network (local area network; LAN) 40. A client terminal 30 is likewise connected to the LAN 40, being arranged for communicating with the bank-note processing machine 20a.

The bank-note processing machine 20a and the client terminal 30 are connected via the LAN 40 to an external communication network 50, preferably to the Internet. The bank-note processing machine 20b is connected directly to the external communication network 50.

Figure 2:
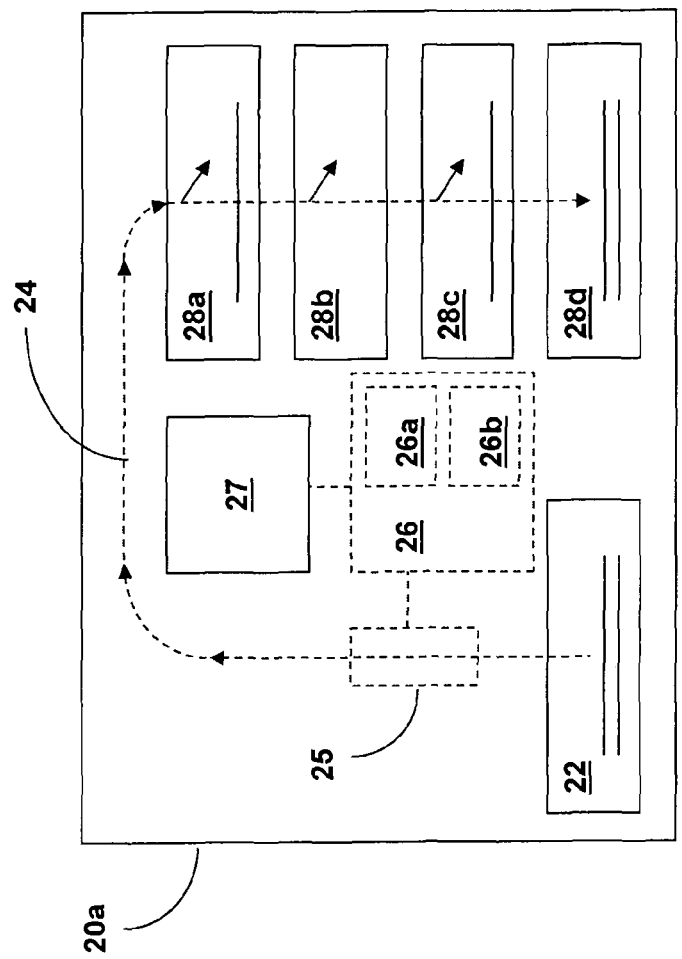

FIG. 2 shows a detail view of the bank-note processing machine 20a which can, but does not have to, be identically constructed to the bank-note processing machine 20b. On the face or front side the bank-note processing machine 20a has an input pocket 22 into which a stack of bank notes can be inserted for processing by the bank-note processing machine 20a, as indicated schematically in FIG. 2. In the preferred embodiment represented in FIG. 2, the bank notes are inserted into the input pocket 22 with their long side or longitudinal side facing an operating person sitting or standing in front of the bank-note processing machine 20a. The bank notes are singled out of the input pocket 22 by means of a suitable singling device and transferred to a first portion of a following transport system 24 of the bank-note processing machine 20a, which feeds the singled bank notes to a checking device 25. As is known to the person skilled in the art, the transport system 24 of the bank-note processing machine 20a can be realized for example by means of a multiplicity of guiding or diverting elements and belt-driven driving rollers. By means of the checking device 25 there can be tested selectable criteria of a bank note being moved through the checking device 25. Depending on this check, the bank notes are fed, in the further course of the transport system 24 of the bank-note processing machine 20a, to one of the output pockets 28a-d preferably through the suitable actuation of a multiplicity of gate devices. Preferably, the bank-note processing machine 20a further comprises a user interface in the form of a touchscreen 27, on which information e.g. about the state of the bank-note processing machine 20a can be displayed to a user and/or the user can make inputs for example for controlling the bank-note processing machine 20a.

Specifically, the bank-note processing machine 20a represented in FIG. 2 works as follows. The bank notes inserted into the input pocket 22 are fed by means of the singling device consecutively, bank note by bank note, to the transport system 24 of the bank-note processing machine 20a. The transport system 24 transports the bank notes and guides them through the checking device 25, which is arranged for determining raw data and/or measuring data (i.e. measuring data that have already been processed further) with regard to at least one physical (e.g. optical) property of a bank note guided through the checking device 25. The thus determined raw data and/or measuring data of the bank note are employed by a central control device 26, connected to the checking device 25, of the bank-note processing machine 20a for associating the bank note with a certain class and feeding it to one of the output pockets 28a-d according to this classification. The possible classes from which one can be selected are for example the denominations of the different bank notes. Possible classes can then be provided for example for 5, 10, 20, 50, 100, 200 and 500 euro notes. However, the establishment of a class can in general also be effected with regard to authenticity and/or fitness, i.e. the suitability of the bank note for reuse. The individual possible classes then reflect for example different degrees of authenticity or fitness of the bank notes, such as for example "authentic", "circulable", "to be destroyed", and the like. Preferably, the checking device 25 is a device having suitable light sources and optical sensors for measuring optical properties, e.g. the absorption behavior and/or reflection behavior, of a bank note in one or more selected wavelength regions, and thus for producing raw data and/or measuring data of a respective bank note.

In the preferred embodiment represented in FIG. 2, the central control device 26 comprises a processor unit 26a and a memory unit 26b. The central control device 26 may, according to a preferred embodiment of the invention, be an industrial PC or a corresponding mainboard. The memory unit 26b of the central control device 26, which may be e.g. a non-volatile memory in the form of a fixed-disk memory or a flash memory, preferably has implemented thereon a known PC operating system, e.g. WINDOWS or LINUX.

Preferably, the memory unit 26b of the central control device 26 has stored thereon, besides an operating system, only the software modules that are necessary for the standard operation of the bank-note processing machine 20a. Preferably, the memory unit 26b has stored thereon a user-interface software module, i.e. a software module for controlling the user interface 27 in the form of a touchscreen, a transport-system software module, i.e. a software module for coordinated actuation of the components forming the transport system 24, and a checking-device software module, i.e. a software module for operating the checking device 25. As the person skilled in the art will appreciate, these functions which are necessary for operating the bank-note processing machine can in principle be provided by a single software module, i.e. the user-interface software module, the transport-system software module and the checking-device software module can also be combined into a single control software module. According to a further variant according to the invention, it is imaginable that the checking device 25 itself has a processor unit on which a checking-device software module is implemented. In this case, the memory unit 26b of the central control device 26 preferably has installed thereon a software module which cooperates suitably with the checking-device software module implemented on the checking device 25.

As can be taken from FIG. 1 again, both the bank-note processing machine 20a and the bank-note processing machine 20b are connected via the external communication network 50 (preferably the Internet) to an application server 60, which preferably has implemented thereon further software modules which respectively provide optional applications that are not absolutely necessary for operating the bank-note processing machine 20a or 20b, but provide additional optional services or functions that a user can use in addition to the applications of the standard operation of the bank-note processing machine 20a or 20b. These additional applications, which in conventional bank-note processing machines must be provided by the processor unit of such a bank-note processing machine, are thus relocated to the application server 60 according to the invention. The application server 60, which can be connected to a database 70, thus makes available to the bank-note processing machine 20a or 20b, acting as the client in this case, via the external communication network 50 in particular computing capacity, data memory and optional applications provided by software modules, in a form that can be adapted to the needs of the bank-note processing machine 20a or 20b. According to the invention, it is conceivable for example that the operator of the bank-note processing machine 20a or 20b rents from the operator of the application server 60, or pays for, a maximum computing capacity, maximum data-memory size, selected software modules and/or a maximum number of application instances, which can be adapted manually or fully automatically depending on the requirements of the operator of the bank-note processing machine 20a or 20b.

According to a preferred embodiment of the invention, there is executed on the application server 60 a configuration application (also called an adaptation application) which is provided by a corresponding optional software module provided on the application server and is not necessary for the standard operation of the bank-note processing machine 20a or 20b. By means of the configuration application executed thereon, the application server 60 is arranged for analyzing the raw data and/or measuring data of the checking device 25 of the bank-note processing machine 20a (or the bank-note processing machine 20b) and adapting, in dependence on this analysis of the raw data and/or measuring data, a configuration data set, where applicable, that is stored on the application server 60 or the database 70 connected thereto. In this connection, a separate configuration data set is preferably stored for each type of bank-note processing machine on the application server 60 or the database 70 connected thereto. The configuration data set for a certain type of bank-note processing machine can define, for a bank note's physical properties measured by the checking device 25, respective values ranges within which respectively measured properties of a bank note must fall in order for it to be assignable to a certain class, e.g. a certain value, "authentic"/"false", and the like.

Due to the configuration application executed thereon, the application server 60 is arranged for performing an adaptation of the configuration data set in particular when it has been determined that the raw data and/or measuring data provided by the bank-note processing machine 20a or 20b are based on a bank note recognized as a forgery. This recognition of a false bank note using the raw data and/or measuring data can be effected by the configuration application provided on the application server 60 and/or by the central control device 26 of the bank-note processing machine 20a.

It is for example conceivable that in the case of a bank note recognized as false (due to other measured properties), a property is measured whose value lies within a values range of the configuration data set in which a bank note is deemed authentic. In this case, the application server 60 is arranged, due to the configuration application executed thereon, for newly determining the limits of this values range such that the value measured for the one property of the false bank note that hitherto lay within this values range is also no longer comprised by the newly determined values range. Alternatively or additionally, the configuration application can be arranged for producing, on the basis of the raw data and/or measuring data of a bank note determined as a forgery, a template of such a forged bank note. Such a template can be employed when processing further bank notes for identifying and sorting out false bank notes.

After such an adaptation of a configuration data set has been carried out by means of the configuration application on the application server 60 for a certain type of bank-note processing machine, the adapted configuration data set can be stored by the application server 60 in the database 70, and made available to a certain bank-note processing machine (e.g. the bank-note processing machine 20a or 20b) and/or to all bank-note processing machines of a certain type.

According to a preferred embodiment of the invention, there is additionally or alternatively executed on the application server 60 a serial-number application which is provided by a corresponding optional software module provided on the application server 60 and is not necessary for the standard operation of the bank-note processing machine 20a or 20b. By means of the serial-number application executed thereon, the application server 60 is arranged for analyzing the raw data and/or measuring data of the checking device 25 of the bank-note processing machine 20a (as well as the raw data and/or measuring data of the checking devices of the further bank-note processing machines connected to the application server 60) and for extracting therefrom the serial numbers of the processed bank notes. In case the raw data and/or measuring data provided by the bank-note processing machine 20*a* contain a respective bank note's image data, the application server 60 is preferably arranged, by means of the serial-number application executed thereon, for extracting a respective bank note's serial number from the corresponding image data.

Preferably, the application server 60 is arranged, by means of the serial-number application executed thereon, for maintaining preferably on the database 70 a serial-number archive in which new serial numbers can be stored and serial numbers that have already been entered can be retrieved. In the serial-number archive the serial number determined for a bank note is preferably stored together with further data relating to the bank note, such as e.g. the bank-note value, the bank-note processing machine with which this bank note was processed, date and time of processing, the intensity of a security feature of the bank note as measured by the checking device of the bank-note processing machine, the limpness of the bank note, the presence of an adhesive strip on the bank note, and the like. By means of these data stored in the serial-number archive, the application server 60 is able to supervise the bank-note circulation in particular between the bank-note processing machines that are in communication with the application server 60. Further, the application server 60 is able due to the serial-number application executed thereon to more easily recognize false money using the central serial-number archive or to retrieve marked bank notes whose serial numbers are known. Finally, the application server 60 is able due to the serial-number application executed thereon to collect information about how fast a bank note and/or individual security features of a bank note wear out using the central serial-number archive.

According to a preferred embodiment of the invention, there is additionally or alternatively executed on the application server 60 a reporting application which is provided by a corresponding optional software module provided on the application server 60 and is not necessary for the standard operation of the bank-note processing machine 20*a* or 20*b*. By means of the reporting application executed thereon, the application server 60 is arranged for accordingly editing the raw data and/or measuring data provided by a bank-note processing machine as well as further data relating to the bank-note processing machine, such as operating data of the bank-note processing machine or accounting data, and for automatically creating an electronic document in a form definable by the user of the bank-note processing machine, for example in the form of a Word document, PDF document and/or Excel file. Creating such electronic documents in a certain form may be prescribed for example by legal stipulations for the operation of a bank-note processing machine.

According to a preferred embodiment of the invention, there is additionally or alternatively executed on the application server 60 a servicing application which is provided by a corresponding optional software module provided on the application server 60 and is not necessary for the standard operation of the bank-note processing machine 20*a* or 20*b*. By means of the servicing application executed thereon, the application server 60 is arranged for determining and supervising the need for servicing of a bank-note processing machine 20*a*, 20*b* on the basis of the raw data and/or measuring data provided by the bank-note processing machine 20*a*, 20*b*. The servicing application executed on the application server 60 can for example determine the need for servicing of a bank-note processing machine 20*a*, 20*b* by comparing the raw data and/or measuring data of a bank-note processing machine 20*a*, 20*b* with the raw data and/or measuring data of bank-note processing machines of the same type. If this comparison yields a drop in performance of the bank-note processing machine 20*a*, 20*b*, the servicing application executed on the application server 60 can prompt a servicing of this bank-note processing machine 20*a*, 20*b*. Alternatively or additionally, the servicing application provided on the application server 60 can, on the basis of the raw data and/or measuring data provided by a bank-note processing machine 20*a*, 20*b*, prompt the servicing of this bank-note processing machine 20*a*, 20*b* when for example the raw data and/or measuring data indicate that the bank-note processing machine 20*a*, 20*b* has processed a number of bank notes that is greater than a definable threshold value. In this preferred embodiment, the raw data and/or measuring data provided by a bank-note processing machine preferably further comprise information about error cases occurring in the bank-note processing machine, such as e.g. the malfunctioning of a component of the bank-note processing machine, the forming of a bank-note jam at a certain place in the bank-note processing machine, and the like. Preferably, the application server 60 is arranged, due to the servicing application executed thereon, for prompting, due to the information about error cases occurring for example on average after the processing of a certain number of bank notes in bank-note processing machines of a certain type, the servicing of a bank-note processing machine of this type in which this error case has hitherto not occurred.

Although it was described hereinabove that the external communication network 50 is preferably the Internet, the person skilled in the art will appreciate that the present invention can also be advantageously implemented by means of other communication networks. Accordingly, the communication network 50 may also be a non-public communication network, e.g. a company's communication network. According to the invention, hybrid solutions are likewise imaginable in which e.g. a company operates a multiplicity of bank-note processing machines and an application server via a non-public communication network according to the invention, but can, when necessary, access a further application server accessible via the Internet in order to absorb load peaks for example.

According to a preferred embodiment, in particular in case the communication network is at least partly the publicly accessible Internet, a respective bank-note processing machine 20*a*, 20*b* and/or the application server 60 has stored thereon electronic keys for mutual authentication and/or encryption of the data transfer between a bank-note processing machine 20*a*, 20*b* and the application server 60. Before the bank-note processing machine 20*a*, 20*b* can access the optional applications executed on the application server 60, and/or the bank-note processing machine 20*a*, 20*b* can relay raw data and/or measuring data to the application server 60 for further processing by the applications executed thereon, a challenge-response authentication must preferably first be carried out successfully between the bank-note processing machine 20*a*, 20*b* and the application server 60. In the optional encryption of the data transfer between a respective bank-note processing machine 20*a*, 20*b* and/or the application server 60 there can be used symmetric or asymmetric encryption methods or hybrid methods known to the person skilled in the art.

The person skilled in the art will appreciate that the functions of the hereinabove described application server 60 can also be performed by a multiplicity of application servers, for example by a server farm, which are in communication with the bank-note processing machines 20a, 20b via the communication network 50. In this connection, the hereinabove described applications or software modules which are optional for the operation of the bank-note processing machines 20a, 20b can be implemented or be executed on different application servers.

The invention claimed is:

1. A system for processing value documents, comprising:
at least one bank-note processing machine having a hardware image sensor and a hardware sorting component for physically sorting bank notes, and further having a central control device on which there are implemented software modules for operation of the bank-note processing machine, wherein the central control device comprises an industrial PC configured to analyze the software modules to identify and classify the software modules as being optional or necessary for operation of the bank-note processing machine, such that software modules classified as necessary that are necessary for standard operation of the bank-note processing machine remain on the industrial PC, and wherein at least one software module classified as optional for operation of the bank-note processing machine is moved to or remains on an application server; and
the application server which is connected to the bank-note processing machine via a communication network and on which there is implemented at least one further software module which is executed on the application server and provides to the bank-note processing machine an application which provides at least one function going beyond the standard operation of the bank-note processing machine, wherein the application server flexibly supplements processing power of the bank-note processing machine according to current processing demands of the bank-note processing machine,
wherein the bank-note processing machine comprises at least one checking device which captures raw data and/or measuring data of the bank notes processed with the bank-note processing machine, wherein the raw data and/or measuring data provided by the checking deuce of the bank-note processing machine comprise serial-number data of the bank notes processed by the bank-note processing machine, wherein the application server is arranged, due to a serial-number application executed thereon, for storing in a serial-number archive the serial-number data provided by the bank-note processing machine, and supervising the flow of the bank notes between the bank-note processing machines that are in communication with the application server, using the serial-number data provided by the bank-note processing machine as well as using the serial-number archive.

2. The system according to claim 1, wherein the central control device of the bank-note processing machine is a corresponding mainboard on which a PC operating system is installed.

3. The system according to claim 1, wherein the at least one further software module implemented on the application server provides an application which is arranged for processing the raw data and/or measuring data captured by the checking device of the bank-note processing machine.

4. The system according to claim 3, wherein the application server has stored therein for each type of bank-note processing machine, configuration data which can be employed by the bank-note processing machine in connection with the raw data and/or measuring data of the bank note for rating or classifying the banknote, and wherein a configuration application is executed on the application server, so that the application server is arranged for adapting the configuration data stored therein for each type of bank-note processing machine on the basis of the raw data and/or measuring data, in order to make the adapted configuration data available to bank-note processing machines of a corresponding type.

5. The system according to claim 3, wherein a reporting application is executed on the application server, so that the latter is arranged for accordingly editing the raw data and/or measuring data provided by the bank-note processing machine and creating therefrom a report in a definable form.

6. The system according to claim 3, wherein a servicing application is executed on the application server, so that the latter is arranged for determining and supervising a need for servicing of the bank-note processing machine on the basis of the raw data and/or measuring data provided by the bank-note processing machine.

7. The system according to claim 1, wherein the application server, due to the serial-number application executed thereon, is arranged for extracting a serial number of the bank note from image data of the bank note which are part of the raw data and/or measuring data provided by the bank-note processing machine.

8. The system according to claim 1, wherein the bank-note processing machine and/or the application server has stored thereon electronic keys by means of which a transfer of data between the bank-note processing machine and the application server can be encrypted and/or an authentication process can be carried out between the bank-note processing machine and the application server, wherein the authentication process is preferably a mutual challenge-response authentication.

9. A method for processing value documents, wherein the method comprises the following steps:
executing, by a bank-note processing machine having a hardware image sensor and a hardware sorting component for physically sorting bank notes, and further having a central control device on which there are implemented software modules for operation of the bank-note processing machine, the central control device comprising an industrial PC configured to analyze the software modules to identify and classify the software modules as being optional or necessary for operation of the bank-note processing machine, such that software modules classified as necessary that are necessary for standard operation of the bank-note processing machine remain on the industrial PC, and wherein at least one software module classified as optional for operation of the bank-note processing machine is moved to or remains on an application server; and
executing at least one further software module on the application server which can communicate with the bank-note processing machine via a communication network, wherein the at least one further software module provides an application which provides at least one function going beyond the standard operation of the bank-note processing machine, and wherein the application server flexibly supplements processing power of the bank-note processing machine according to current processing demands of the bank-note processing machine, wherein the bank-note processing machine comprises at least one checking device which captures raw data and/or measuring data of the bank notes processed with the bank-note processing machine, wherein the raw data and/or measuring data provided by the checking deuce of the bank-note processing machine comprise serial-number data of the bank notes processed by the bank-note processing machine, wherein the application server is arranged, due to a serial-number application executed thereon, for storing in a serial-number archive the serial-number data provided by the bank-note processing machine, and supervising the flow of the bank notes between the bank-note processing machines that are in communication with the application server, using the serial-number data provided by the bank-note processing machine as well as using the serial-number archive.

* * * * *